United States Patent
Maruyama (10) Patent No.: US 9,216,736 B2
(45) Date of Patent: Dec. 22, 2015

(54) CONTROL DEVICE FOR HYBRID VEHICLE

(71) Applicant: Tomoyuki Maruyama, Tajimi (JP)

(72) Inventor: Tomoyuki Maruyama, Tajimi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/115,490

(22) PCT Filed: Feb. 13, 2013

(86) PCT No.: PCT/JP2013/053423
§ 371 (c)(1),
(2) Date: Nov. 4, 2013

(87) PCT Pub. No.: WO2014/125585
PCT Pub. Date: Aug. 21, 2014

(65) Prior Publication Data
US 2015/0336567 A1    Nov. 26, 2015

(51) Int. Cl.
*B60L 9/00* (2006.01)
*B60W 20/00* (2006.01)
(Continued)

(52) U.S. Cl.
CPC .................. *B60W 20/40* (2013.01); *B60K 6/24* (2013.01); *B60K 6/365* (2013.01); *B60K 6/445* (2013.01); *B60W 10/06* (2013.01); *B60W 10/08* (2013.01); *B60W 10/12* (2013.01); *B60W 2510/125* (2013.01); *B60W 2710/06* (2013.01); *B60W 2710/08* (2013.01); *B60W 2710/125* (2013.01);
(Continued)

(58) Field of Classification Search
CPC ..... B60W 20/00; B60W 10/08; B60W 20/40; B60W 10/12; F16H 3/72; F16H 48/06; B60K 6/365; B60K 6/48; B60K 6/24
See application file for complete search history.

(56) References Cited

U.S. PATENT DOCUMENTS 8,888,636 B2 * 11/2014 Ikegami ................ B60K 6/365
475/207
2010/0004089 A1   1/2010 Iwase et al.
(Continued)

FOREIGN PATENT DOCUMENTS

| JP | A-2007-246054 | 9/2007 |
| JP | 2009-012532 A | 1/2009 |
| JP | 2010-036880 A | 2/2010 |
| JP | 2010-127074 A | 6/2010 |
| JP | A-2010-221853 | 10/2010 |

OTHER PUBLICATIONS

Oct. 14, 2014 Office Action issued in Japanese Application No. 2013-552755.

*Primary Examiner* — Behrang Badii
(74) *Attorney, Agent, or Firm* — Oliff PLC (57) ABSTRACT

This control device is applied to a hybrid vehicle that is provided with a motor lock mechanism that changes over the state of a power distribution mechanism between a differentiating state in which a differentially rotating state between an engine and a first motor-generator is permitted, and a non-differentiating state in which the rotation of the first motor-generator is prohibited. The control device stops combustion by the engine and changes over to an EV mode when predetermined conditions become valid during implementation by the power distribution mechanism of a differentiating mode of the differentiating state or of a non-differentiating mode of the non-differentiating state. The condition is set to be more severe while the non-differentiating mode is being implemented, as compared with the case while the differentiating mode is being implemented.

4 Claims, 9 Drawing Sheets

(51) Int. Cl.
  *B60W 10/12* (2012.01)
  *B60W 10/06* (2006.01)
  *B60W 10/08* (2006.01)
  *B60K 6/24* (2007.10)
  *B60K 6/445* (2007.10)
  *B60K 6/365* (2007.10)
  *F16H 37/08* (2006.01)

(52) U.S. Cl.
  CPC ...... *F16H 2037/0866* (2013.01); *Y10S 903/905* (2013.01); *Y10S 903/91* (2013.01); *Y10S 903/93* (2013.01)

(56) References Cited

U.S. PATENT DOCUMENTS

| | | | | |
|---|---|---|---|---|
| 2010/0125020 | A1* | 5/2010 | Ikegami | B60K 6/365 477/3 |
| 2012/0095635 | A1* | 4/2012 | Kanno | B60K 6/445 701/22 |
| 2015/0258976 | A1* | 9/2015 | Takahashi | B60W 20/00 701/22 |

* cited by examiner

CONTROL DEVICE FOR HYBRID VEHICLE

TECHNICAL FIELD

The present invention relates to a control device that is applied to a hybrid vehicle that is provided with an engine and with a motor-generator as power sources for driving.

BACKGROUND ART

As a control device for a hybrid vehicle, a device is per se known (refer to Patent Document #1) that, during travel powered by an internal combustion engine, disconnects the engine with a clutch when the accelerator opening amount becomes less than or equal to a predetermined value, thereby changing over to an EV mode in which a motor-generator is used as the power source for propulsion. Moreover, for a hybrid vehicle that includes a differential mechanism that links together an engine and a motor-generator and a lock mechanism that changes over this differential mechanism between a differentiating state in which it permits a differentially rotating state between the engine and the motor-generator and a non-differentiating state in which it prohibits the differentially rotating state between the engine and the motor-generator, a control device is per se known (refer to Patent Document #2) that implements a differentiating mode in which propulsion using the engine is performed with the differential mechanism in the differentiating state, and a non-differentiating mode in which propulsion using the engine is performed with the differential mechanism in the non-differentiating state.

CITATION LIST

Patent Literature

Patent Document #1: Japanese Laid-Open Patent Publication 2010-221853.
Patent Document #2: Japanese Laid-Open Patent Publication 2007-246054.

SUMMARY OF INVENTION

Technical Problem

With the control device of Patent Document #2, while it is possible, in the state with the differentiating mode established, to transition to the EV mode simply by stopping combustion by the engine, by contrast, in order to perform transition to the EV mode from the non-differentiating mode, it is necessary to change the differential mechanism over from the non-differentiating state to the differentiating state with the lock mechanism before stopping combustion by the engine. Due to this, with the control device of Patent Document #2, if, without making any distinction between the differentiating mode and the non-differentiating mode, changing over to the EV mode is performed indiscriminately only on the basis of the accelerator opening amount, as in the case of the control device of Patent Document #1, then there is a possibility that a negative influence will be exerted upon the durability of the lock mechanism, due to the increased frequency of operation of the lock mechanism.

Thus, the object of the present invention is to provide a control device for a hybrid vehicle, that is capable of preventing decrease in the durability of the lock mechanism.

Solution to Technical Problem

The control device of the present invention includes: an internal combustion engine; a motor-generator; a differential mechanism that links together the engine and the motor-generator; and a lock mechanism that is capable of changing over the state of the differential mechanism between a differentiating state in which a differentially rotating state between the engine and the motor-generator is permitted, and a non-differentiating state in which the differentially rotating state between the engine and the motor-generator is prohibited; that is applied to a hybrid vehicle which is capable of implementing: an EV mode in which, with the state of the differential mechanism being the differentiating state, combustion by the engine is stopped; a differentiating mode in which, with the state of the differential mechanism being the differentiating state, rotation of the engine is continued; and a non-differentiating mode in which, with the state of the differential mechanism being the non-differentiating state, rotation of the engine is continued; and that stops combustion by the engine and changes over to the EV mode, when a predetermined condition becomes valid during implementation of the differentiating mode or of the non-differentiating mode; and wherein the predetermined condition is set to be more severe during implementation of the non-differentiating mode, as compared with the case during implementation of the differentiating mode.

The differentiating mode is a state in which a differentially rotating state is permitted between the engine and the motor-generator. Due to this, along with the engine rotational speed dropping towards zero simply by combustion in the engine being stopped, also the motor-generator runs idle, and moreover a changeover is performed from the differentiating mode to the EV mode. On the other hand, since in the non-differentiating mode the differentially rotating state between the engine and the motor-generator is prohibited, accordingly, if the differential mechanism is still in the non-differentiating state, the engine rotational speed cannot become zero even if combustion in the engine is stopped. Thus, when changing over from the non-differentiating mode to the EV mode, before stopping combustion in the engine, it is necessary to actuate the lock mechanism to change over the differential mechanism from the non-differentiating state to the differentiating state. When during vehicle traveling a transition is executed to the EV mode and the engine rotational speed becomes zero, the system efficiency is enhanced because no energy is required for making the engine rotate while combustion therein is stopped. However if, with high consideration being given to enhancement of the system efficiency, the frequency of actuation of the lock mechanism is increased by changing over to the EV mode according to the same condition both during the differentiating mode and during the non-differentiating mode, then there is a fear of deterioration of the durability of the lock mechanism. However, according to the control device of the present invention, the condition for changing over from the differentiating mode or from the non-differentiating mode to the EV mode is set to be more severe during implementation of the non-differentiating mode, as compared with the case during implementation of the differentiating mode. Due to this, it becomes more difficult to change over from the non-differentiating mode to the EV mode, as compared to changing over from the differentiating mode to the EV mode. Accordingly, the frequency of changing over from the non-differentiating mode to the EV mode is reduced, as compared with the case of setting the same condition for the differentiating mode and for the non-differentiating mode. In other words, the frequency of actuation of the lock mechanism is reduced, as compared with the case when the same condition is set for the two modes. Accordingly, it is possible to anticipate enhancement of the system efficiency while still suppressing deterioration of the durability of the lock mechanism.

In one aspect of the control device of the present invention: the engine may have a plurality of cylinders, and may be capable of executing partial cylinder operation in which some of the plurality of cylinders are inactivated while the remainder of the plurality of cylinders operate, and all-cylinder operation in which all of the plurality of cylinders operate; the non-differentiating mode may include an all-cylinder non-differentiating mode in which the engine executes the above all-cylinder operation and a partial cylinder non-differentiating mode in which the engine executes the above partial cylinder operation; and, during implementation of the partial cylinder non-differentiating mode, the predetermined condition may be set to be more severe, as compared with the case during implementation of the all-cylinder non-differentiating mode.

The frictional torque is smaller during partial cylinder operation, as compared with the case during all-cylinder operation. Due to this, the losses are smaller if the partial cylinder non-differentiating mode is maintained, as compared with the case if the all-cylinder non-differentiating mode is maintained. Accordingly, while suppressing deterioration of the system efficiency, it is possible to reduce the frequency of changing over from the partial cylinder non-differentiating mode to the EV mode, to below the frequency of changing over from the all-cylinder non-differentiating mode to the EV mode. According to this aspect, reduction in the durability of the lock mechanism is further suppressed, since the frequency of actuation of the lock mechanism during implementation of the partial cylinder non-differentiating mode is reduced below the frequency during implementation of the all-cylinder non-differentiating mode. On the other hand the system efficiency is enhanced, since it becomes easier to change over to the EV mode during implementation of the all-cylinder non-differentiating mode, than during implementation of the partial cylinder non-differentiating mode.

And, in another aspect of the control device of the present invention, when the predetermined condition becomes valid during implementation of the differentiating mode or of the non-differentiating mode, and moreover the vehicle is performing inertial traveling, the combustion in the engine may be stopped and changeover to the EV mode may be performed. According to this embodiment, the system efficiency is enhanced during inertial traveling.

DESCRIPTION OF EMBODIMENTS

Embodiment #1

Figure 1:
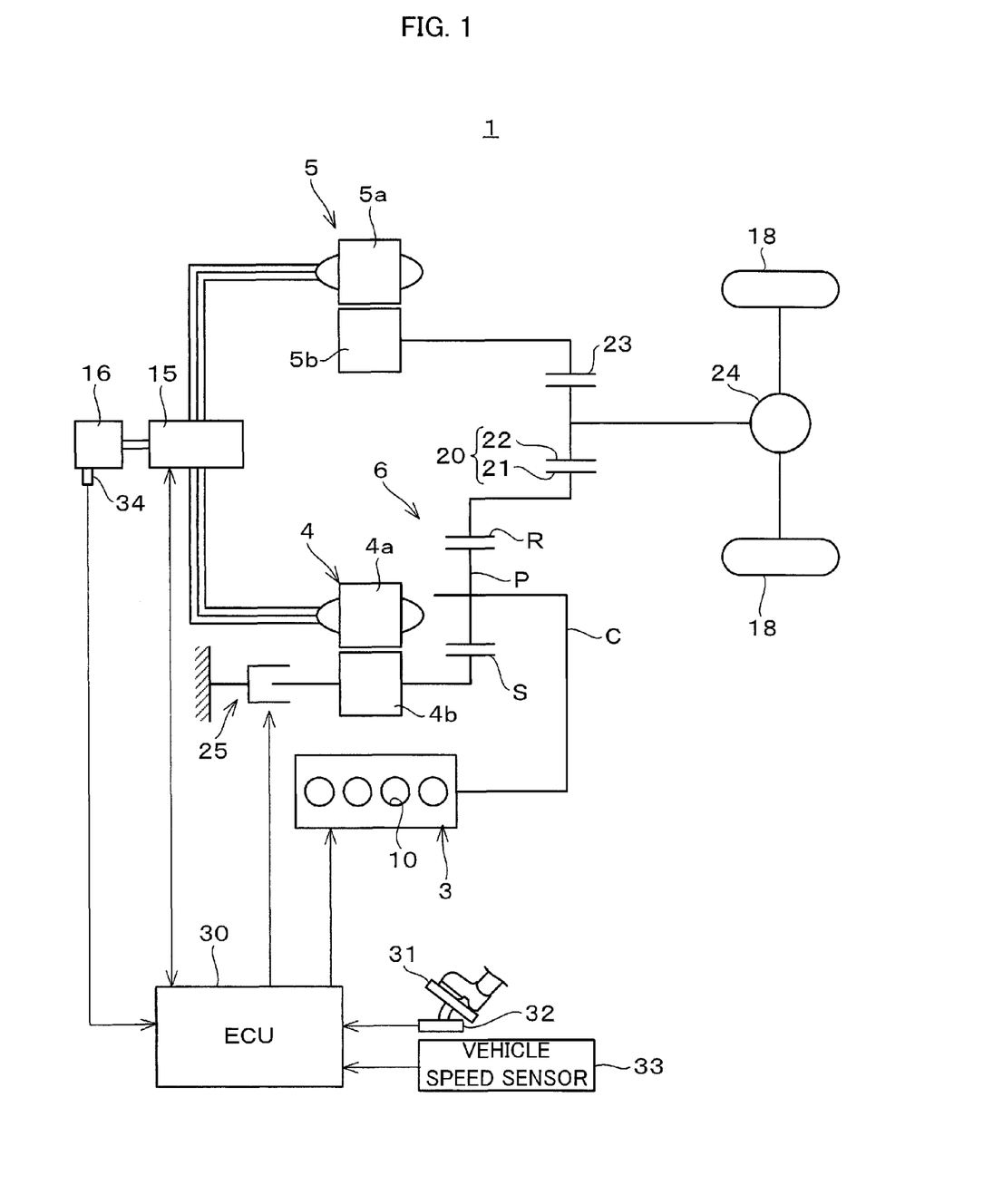
FIG. 1 is a figure showing the overall structure of a vehicle to which a control device according to an embodiment of the present invention is applied.

As shown in FIG. 1, a vehicle 1 is built as a hybrid vehicle in which a plurality of power sources are combined. As power sources for propulsion, the vehicle 1 includes an engine 3 and two motor-generators 4 and 5. The engine 3 is built as an in-line type internal combustion engine and has four cylinders 10. Apart from an all-cylinder operating mode in which all four of the cylinders 10 operate together, the engine 3 is also capable of implementing partial cylinder operation in which two of the four cylinders 10 are deactivated while the other two cylinders 10 operate. When the engine 3 is implementing partial cylinder operation, this corresponds to downsizing to an engine that produces a smaller amount of exhaust, and so the engine 3 has an output power characteristic that is lower than when all-cylinder operation is being implemented.

The engine 3 and the first motor-generator 4 are linked together by a power distribution mechanism 6, which serves as a differential mechanism. The first motor-generator 4 has a stator 4a and a rotor 4b. By receiving power from the engine 3 that has been split off by the power distribution mechanism 6, the first motor-generator 4 functions as a generator which generates electricity; and it can also function as an electric motor by being driven with AC electrical power. In a similar manner, the second motor-generator 5 has a stator 5a and a rotor 5b, and functions both as an electric motor and as a generator. The first motor-generator 4 corresponds to the "motor-generator" of the Claims. Both of the motor-generators 4 and 5 are connected to a battery 16 via a motor control device 15. The motor control device 15 converts the AC power generated by the motor-generators 4 and 5 into DC power which is used for charging up the battery 16, and also converts the DC power of the battery 16 into AC power which is supplied to the motor-generators 4 and 5.

The power distribution mechanism 6 is built as a single pinion type planetary gear mechanism. This power distribution mechanism 6 comprises a sun gear S that is an external gear, a ring gear R that is an internal gear and that is arranged coaxially with the sun gear S, and a planetary carrier C that freely rotatably supports a pinion P that is meshed with these gears S and R. The engine torque outputted by the engine 3 is transmitted to the planetary carrier C of the power distribution mechanism 6. The rotor 4b of the first motor-generator 4 is linked to the sun gear S of the power distribution mechanism 6. And torque outputted from the power distribution mechanism 6 via the ring gear R is transmitted to an output gear train 20. The output gear train 20 functions as an output unit for transmitting torque to drive wheels 18. This output gear train 20 comprises an output drive gear 21 that rotates together with the ring gear R of the power distribution mechanism 6 and an output driven gear 22 that is meshed with the output drive gear 21. The second motor-generator 5 is linked to the output driven gear 22 via a gear 23. In other words, the second motor-generator 5 is linked to the output gear train 20 via the gear 23. This gear 23 rotates together with the rotor 5b of the second motor-generator 5. And torque outputted from the output driven gear 22 is divided between the left and right drive wheels 18 by a differential device 24.

A motor lock mechanism 25 is provided to the power distribution mechanism 6, and serves as a locking mechanism. The motor lock mechanism 25 is capable of changing over the state of the power distribution mechanism 6 between a differentiating state in which a differentially rotating state between the engine 3 and the first motor-generator 4 is permitted and the torque of the engine 3 is split and distributed between the first motor-generator 4 and the output gear train 20, and a non-differentiating state in which the differentially rotating state between the engine 3 and the first motor-generator 4 is prohibited and splitting of the torque of the engine 3 is stopped. This motor lock mechanism 25 is built as a wet multi-plate type brake mechanism. It should be understood that the motor lock mechanism 25 could also be built as a meshing type brake mechanism. The motor lock mechanism 25 is changed over between an engaged state in which it prohibits rotation of the rotor 4b of the first motor-generator 4, and a released state in which it permits rotation of the rotor 4b. This changing over of the motor lock mechanism 25 between the engaged state and the released state is implemented with a hydraulic actuator not shown in the figures. When the motor lock mechanism 25 is actuated to its engaged state, rotation of the rotor 4b of the first motor-generator 4 is prohibited. Due to this, rotation of the sun gear S of the power distribution mechanism 6 is also prohibited. And, due to this, the differentially rotating state between the engine 3 and the first motor-generator 4 is prohibited. In other words, by the motor lock mechanism 25 being actuated to its engaged state, the splitting of the torque of the engine 3 off to the first motor-generator 4 is stopped, and the power distribution mechanism 6 is put into its non-differentiating state.

Control of the various sections of the vehicle 1 is performed by an electronic control device 30 (i.e. by an ECU) that includes a computer. The ECU 30 performs various types of control for the engine 3, the motor-generators 4 and 5, and the motor lock mechanism 25 and so on. In the following, the main features of the control performed by the ECU 30 in connection with the present invention will be explained. Various types of information related to the vehicle 1 are inputted to the ECU 30. For example, the rotational speeds and the torques of the motor-generators 4 and 5 are inputted to the ECU 30 via the motor control device 15. Moreover, an output signal from an accelerator opening amount sensor 32 that outputs a signal corresponding to the amount by which an accelerator pedal 31 is stepped upon, an output signal from a vehicle speed sensor 33 that outputs a signal corresponding to the speed of the vehicle 1, and an output signal from a SOC sensor 34 that outputs a signal corresponding to the charge ratio of the battery 16, are all inputted to the ECU 30.

The ECU 30 refers to the output signal of the accelerator opening amount sensor 32 and to the output signal of the vehicle speed sensor 33 and calculates the drive force that is being requested by the driver, and performs control of the vehicle 1 while changing over to one or another of various modes, so as to optimize the system efficiency for this requested drive force. For example, in the low load region in which the thermal efficiency of the engine is reduced, combustion in the engine 3 is stopped and the EV mode is selected. When the EV mode is selected in the low load region, then the vehicle 1 is driven by the output torque of the second motor-generator 5. Moreover, the EV mode is also selected during inertial traveling, in which, in the state with the accelerator pedal 31 released, the vehicle 1 is traveling due to inertia while decelerating. In this case, regeneration control is performed for the second motor-generator 5, and the vehicle 1 is decelerated by the resistance due to this regeneration control. While, during inertial traveling, it is assumed that the power distribution mechanism 6 is in its differentiating state, along with regenerating control being performed by the second motor-generator 5, also, in the state when the engine rotational speed is zero, generation of electricity by the first motor-generator 4 is stopped, so that the vehicle runs idle. Due to this, no energy is required for rotating the engine 3 in this state with combustion therein having been stopped, so that the system efficiency is enhanced.

On the other hand, if the drive force in the EV mode becomes insufficient or the charge ratio of the battery 16 drops, then the hybrid mode is selected, in which, along with the engine 3, also the second motor-generator 5 is used as a power source for propulsion. When the hybrid mode is selected, then, according to the situation, the ECU 30 changes over the power distribution mechanism 6 to the differentiating mode in which it is put into the differentiating state, or to the non-differentiating mode in which it is put into the non-differentiating state. The change over from the differentiating mode to the non-differentiating mode may be implemented, for example, if the temperature of the first motor-generator 4 has risen to a high temperature that exceeds its permitted limit, or if a locking permission condition becomes valid such as it being necessary to avoid so called power recirculation in which the first motor-generator 4 is rotated in reverse while the differentiating mode is being executed, or the like. It should be understood that, provided that the rotation of the engine 3 is continued, in the differentiating mode and in the non-differentiating mode, not only the situation in which the engine is outputting torque is included, but also the situation in which cutoff of the fuel to the engine 3 is implemented during inertial traveling and the engine runs idle. Furthermore, a partial cylinder differentiating mode in which the engine 3 is implementing partial cylinder operation and an all-cylinder differentiating mode in which the engine 3 is implementing all-cylinder operation are included within the differentiating mode. In a similar manner, a partial cylinder non-differentiating mode in which the engine 3 is implementing partial cylinder operation and an all-cylinder non-differentiating mode in which the engine 3 is implementing all-cylinder operation are included within the non-differentiating mode.

Figure 2:
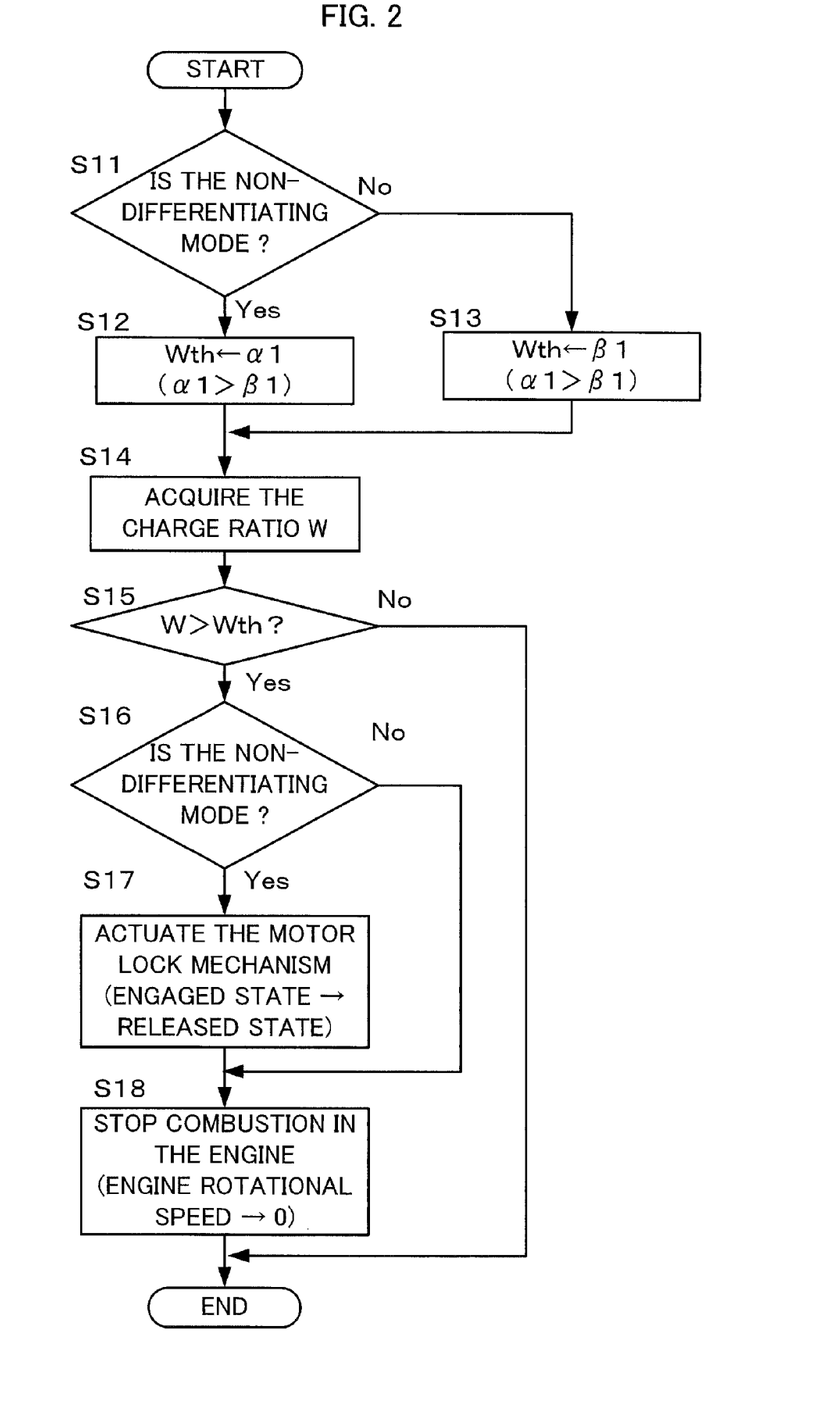
FIG. 2 is a flow chart showing an example of a control routine relating to a first embodiment.

This embodiment is distinguished by the type of control implemented by the ECU 30 when changing over from the differentiating mode or from the non-differentiating mode to the EV mode. In the control according to this embodiment, the ECU 30 changes over from the differentiating mode or from the non-differentiating mode to the EV mode when the charge ratio of the battery 16 has become greater than a predetermined threshold value. The program for the control routine of FIG. 2 is stored in the ECU 30, and is read out at an appropriate time and is executed at predetermined intervals.

In the step S11, the ECU 30 makes a decision as to whether or not the current traveling mode is the non-differentiating mode. If it is the non-differentiating mode, the flow of control proceeds to the step S12, and the value of a threshold value Wth of charge ratio for deciding whether or not to transition to the EV mode is set to a value $\alpha 1$. On the other hand if the current mode is not the non-differentiating mode, in other words in the case of the differentiating mode, then the flow of control is transferred to the step S13 and the value of the threshold value Wth is set to a value $\beta 1$ (where $\alpha 1 > \beta 1$). In other words, the value of this threshold value Wth is set to be greater in the case of the non-differentiating mode, as compared with the case of the differentiating mode.

In the step S14, the ECU 30 acquires the charge ratio W on the basis of the output signal from the SOC sensor 34. Then in the step S15 the ECU 30 makes a decision as to whether or not the charge ratio W thus acquired is greater than the threshold value Wth. If the charge ratio W is greater than the threshold value Wth, then the flow of control proceeds to the step S16. On the other hand, if the charge ratio W is less than or equal to the threshold value Wth, then the subsequent processing is skipped and this iteration of the routine terminates. Due to this, the traveling mode is maintained at the differentiating mode or at the non-differentiating mode.

In the step S16, the ECU 30 makes a decision as to whether or not it is the non-differentiating mode. In the case of the non-differentiating mode the flow of control proceeds to the step S17 and the motor lock mechanism 25 is actuated to change from the engaged state to the released state, so that changeover from the non-differentiating mode to the differentiating mode is performed. On the other hand, in the case of the differentiating mode, this step S17 is skipped and the flow of control proceeds to the step S18, since actuation of the motor lock mechanism 25 is unnecessary.

In the step S18, the ECU 30 outputs an engine rotation stop command and stops combustion in the engine 3. Due to this, the traveling mode is changed over to the EV mode, and, along with the engine rotational speed dropping towards zero, also the first motor-generator 4 runs idle.

Figure 3:
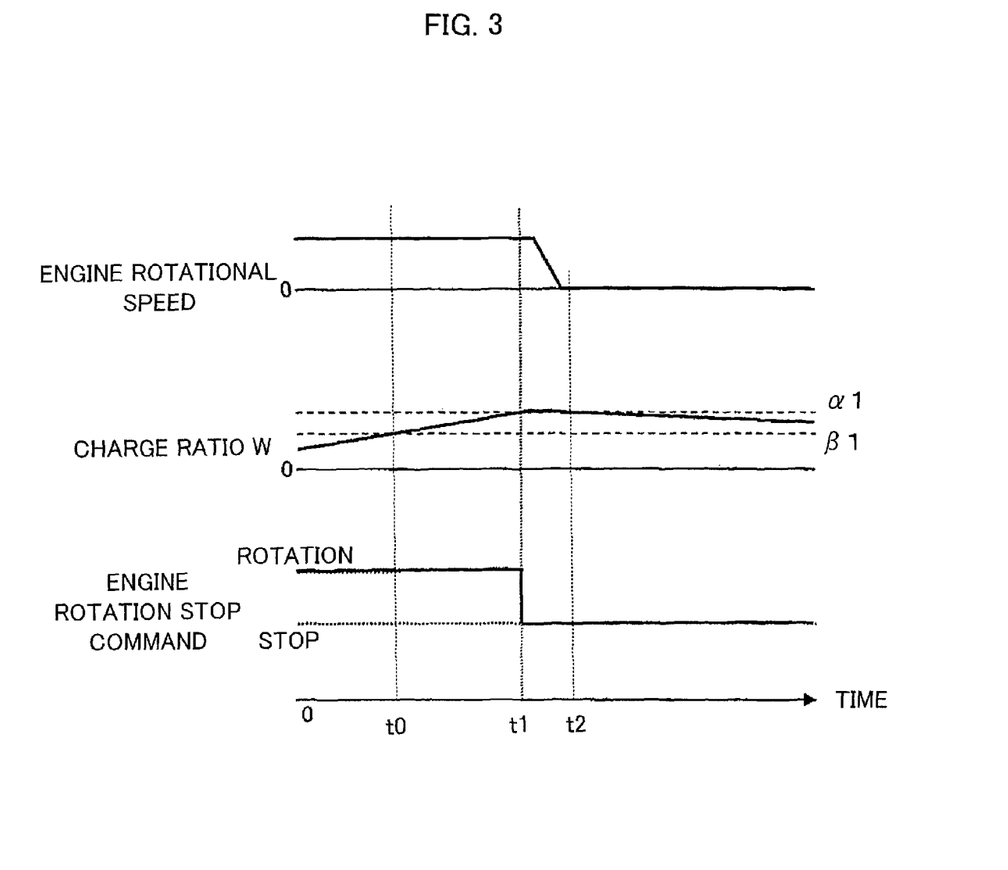
FIG. 3 is a time chart showing an example of control results for this first embodiment in the case of the non-differentiating mode.

According to the control routine of FIG. 2, in the case of the non-differentiating mode, the value of the threshold value Wth is set to be larger, as compared with the case of the differentiating mode. Due to this, as shown in FIG. 3, in the case of the non-differentiating mode, at the time point t0 that the charge ratio W exceeds β1, no engine rotation stop command is outputted, so that the non-differentiating mode is continued. And, at the time instant t1 that the charge ratio W exceeds α1 which is larger than β1, along with the motor lock mechanism 25 being actuated to change over from the engaged state to the released state, also an engine rotation stop command is outputted. Thereafter, the engine rotational speed decreases towards zero. And at the time instant t2 the engine rotational speed becomes zero.

The charge ratio W of the battery 16 is less likely to exceed α1 than to exceed β1. Accordingly, in this embodiment, the condition for changing over to the EV mode is set to be more severe while the non-differentiating mode is being implemented, as compared with the case while the differentiating mode is being implemented. Due to this, it becomes more difficult to implement changing over from the non-differentiating mode to the EV mode, as compared with the case of changing over from the differentiating mode to the EV mode. Accordingly the frequency of changing over to the EV mode from the non-differentiating mode is reduced, as compared with the case when the same condition is set for the differentiating mode and for the non-differentiating mode. In other words, the frequency of actuation of the motor lock mechanism 25 is reduced, as compared with the case when the same conditions are set for the two modes. Accordingly, it is possible to suppress decrease of the durability of the motor lock mechanism 25, and thus enhancement of the system efficiency may be anticipated.

Embodiment #2

Next, a second embodiment of the present invention will be explained with reference to FIGS. 4 and 5. In this second embodiment, the control is distinguished by the fact that, along with the parameter that is set as the condition for changing over to the EV mode being different from the case of the control in the first embodiment, also its threshold value is different between the partial cylinder non-differentiating mode and the all-cylinder non-differentiating mode. Since the other structures and so on of this second embodiment are the same as in the case of the first embodiment, accordingly explanation thereof will be omitted. In this embodiment, the maximum value of the rate of increase of the accelerator opening amount is set as the condition for changing over to the EV mode. In this embodiment, changing over to the EV mode is performed if the maximum value of the rate of increase of the accelerator opening amount is less than a threshold value. To put it in another manner, in this embodiment, if the maximum value of the rate of increase of the accelerator opening amount is greater than or equal to the threshold value, then the differentiating mode or the non-differentiating mode is maintained.

Figure 4:
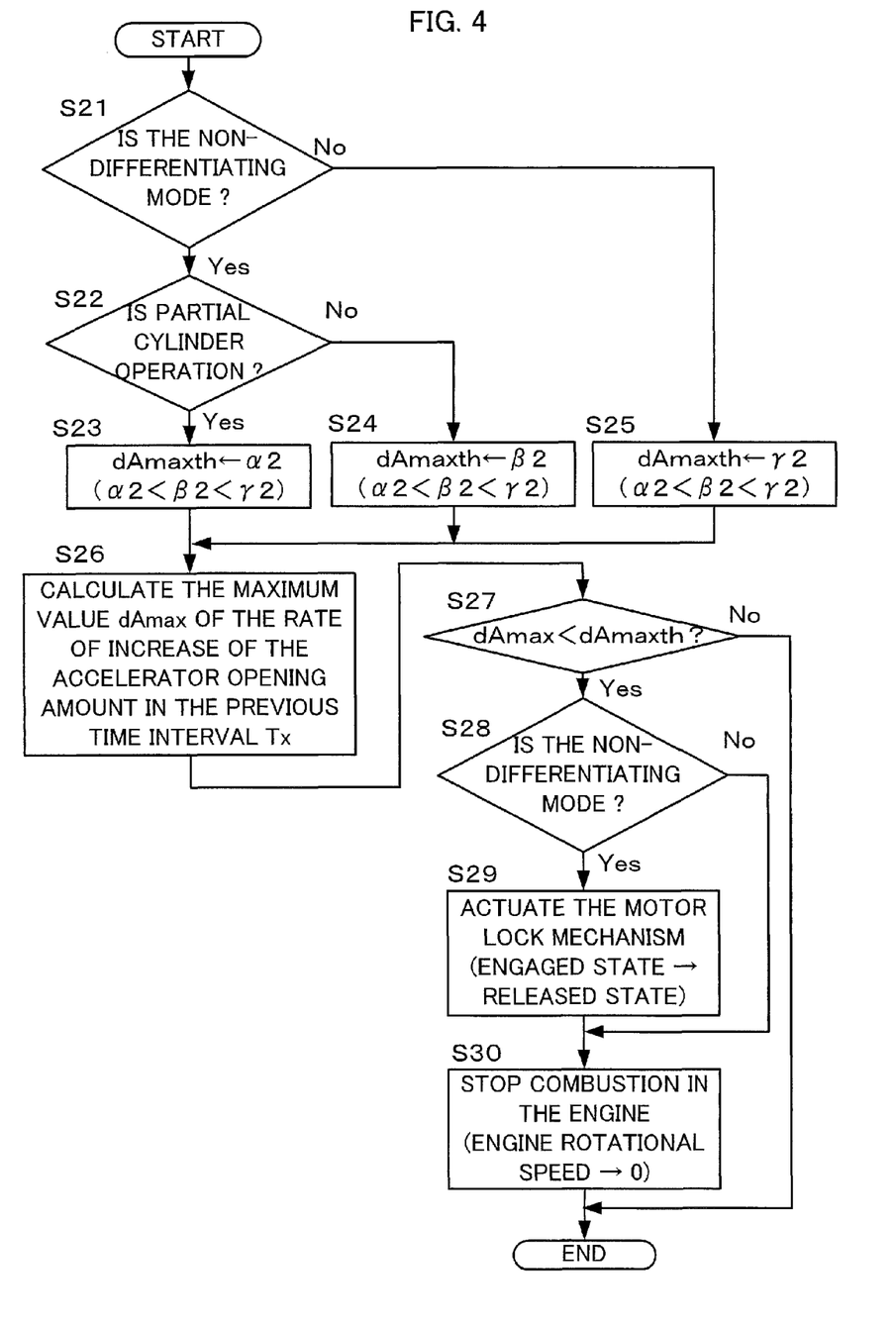
FIG. 4 is a flow chart showing an example of a control routine relating to a second embodiment.
Figure 5:
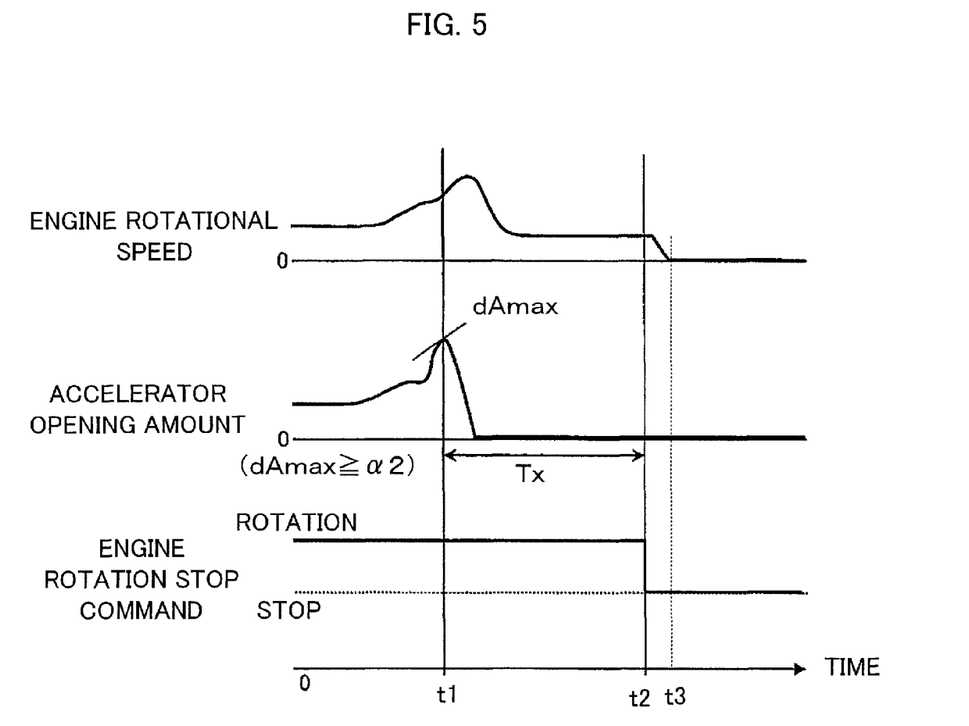
FIG. 5 is a time chart showing an example of control results for this second embodiment in the case of a partial cylinder non-differentiating mode.

The program for the control routine of FIG. 4 is stored in the ECU 30, and is read out at an appropriate time and executed at predetermined intervals. In the step S21, the ECU 30 makes a decision as to whether or not the traveling mode is the non-differentiating mode. If it is the non-differentiating mode then the flow of control proceeds to the step S22. But if it is not the non-differentiating mode, in other words if it is the differentiating mode, then the flow of control is transferred to the step S25. In the step S22, the ECU 30 makes a decision as to whether or not the engine 3 is operating according to partial cylinder operation, in other words whether or not this is the partial cylinder non-differentiating mode. If this is the partial cylinder non-differentiating mode, then the flow of control proceeds to the step S23. But if this is not the partial cylinder non-differentiating mode, in other words if it is the all-cylinder non-differentiating mode, then the flow of control is transferred to the step S24.

In the step S23, the ECU 30 sets the value of a threshold value dAmaxth for the maximum value dAmax of the rate of increase of the accelerator opening amount to α2. And in the step S24 the ECU 30 sets the value of this threshold value dAmaxth to β2. And in the step S25 the ECU 30 sets the value of this threshold value dAmaxth to γ2. The relationship α2<β2<γ2 between α2, β2, and γ2 holds. In other words, the value of the threshold value dAmax during the differentiating mode is set to be greater than in the case of the non-differentiating mode. Moreover, in the case of the non-differentiating mode, the values of the threshold value dAmaxth are set to be different for the partial cylinder non-differentiating mode and for the all-cylinder non-differentiating mode. The value of the threshold value dAmaxth that is employed during implementation of the partial cylinder non-differentiating mode is smaller than the value employed during implementation of the all-cylinder non-differentiating mode.

In the step S26, the ECU 30 calculates the maximum value dAmax of the rate of increase of the accelerator opening amount in the previous time interval Tx. This calculation is implemented by the ECU 30 calculating both the accelerator opening amount and its rate of increase on the basis of the accelerator opening amount sensor 32 and storing them sequentially, and by specifying, from among these stored values, their maximum values during the previous time interval Tx.

In the step S27, the ECU 30 makes a decision as to whether or not the maximum value dAmax of the rate of increase of the accelerator opening amount is less than the threshold value dAmaxth. If the maximum value dAmax is less than the threshold value dAmaxth, then the flow of control proceeds to the step S28. But if the maximum value dAmax is greater than or equal to the threshold value dAmaxth, then the subsequent processing is skipped, and this iteration of the routine terminates. Due to this, the traveling mode is kept in the differentiating mode or in the non-differentiating mode.

In the step S28, the ECU 30 makes a decision as to whether or not this is the non-differentiating mode. In the case of the non-differentiating mode the flow of control proceeds to the step S29, and the motor lock mechanism 25 is actuated from the engaged state to the released state, so that the system changes over from the non-differentiating mode to the differentiating mode. On the other hand, in the case of the differentiating mode, the step S29 is skipped since it is not necessary to actuate the motor lock mechanism 25, and the flow of control is transferred to the step S30.

In the step S30, the ECU 30 outputs an engine rotation stop command, so that combustion in the engine 3 is stopped. Due to this, the traveling mode is changed over to the EV mode, and, along with the engine rotational speed dropping towards zero, also the first motor generator 4 runs idle.

According to the control routine of FIG. 4, in the case of the non-differentiating mode, the value of the threshold value dAmaxth is set to be larger as compared with the case of the differentiating mode. The chance for the maximum value dAmax of the rate of increase of the accelerator opening amount to be less than $\alpha 2$ or $\beta 2$ is lower than the chance for it to be less than $\gamma 2$. Accordingly, the condition for changing over to the EV mode during implementation of the non-differentiating mode is set to be more severe, as compared with the case during implementation of the differentiating mode. Due to this, in this second embodiment, in a similar manner to the case with the first embodiment, it is possible to suppress decrease of the durability of the motor lock mechanism 25, and thus enhancement of the system efficiency may be anticipated.

During partial cylinder operation, the frictional torque in the engine 3 is small as compared with the case during all-cylinder operation. Due to this, in the case of maintaining the partial cylinder non-differentiating mode, the losses are smaller as compared with the case of maintaining the all-cylinder non-differentiating mode. Accordingly it is possible to reduce the frequency of changing over from the partial cylinder non-differentiating mode to the EV mode so that it is less than the frequency of changing over from the all-cylinder non-differentiating mode to the EV mode, while still suppressing deterioration of the system efficiency. In the example of FIG. 5, in the case of the partial cylinder non-differentiating mode, since the maximum value dAmax of the rate of increase of the accelerator opening amount before the time point t1 is greater than or equal to $\alpha 2$, accordingly, during the decision interval Tx from the time point t1 to the time point t2, the partial cylinder non-differentiating mode is maintained without any transition to the EV mode. And, at the time point t2, since the maximum value dAmax during the time period Tx before the time point t2 exceeds $\alpha 2$, accordingly, along with the motor lock mechanism 25 being actuated from the engaged state to the released state, also an engine rotation stop command is outputted. Thereafter, the engine rotational speed drops towards zero. And at the time point t3 the engine rotational speed becomes zero.

According to this second embodiment, since the frequency of actuation of the motor lock mechanism 25 during implementation of the partial cylinder non-differentiating mode is reduced below that frequency during implementation of the all-cylinder non-differentiating mode, accordingly it is possible further to suppress decrease of the durability of the motor lock mechanism 25. On the other hand, the system efficiency is enhanced, since it becomes easier to change over to the EV mode during implementation of the all-cylinder non-differentiating mode, than during implementation of the partial cylinder non-differentiating mode.

Embodiment #3

Next, a third embodiment of the present invention will be explained with reference to FIGS. 6 and 7. In this third embodiment, the control is the same as that in the second embodiment, with the exception of the parameter that is set as the condition for changing over to the EV mode. In this embodiment, the amount of increase $\Delta A$ of the accelerator opening amount over a predetermined time period $\Delta T$ is set as the condition for changing over to the EV mode. In this embodiment, changeover to the EV mode is performed when the amount of increase $\Delta A$ of the accelerator opening amount is less than a threshold value. To put it in another way, in this embodiment, the differentiating mode or the non-differentiating mode is maintained if the amount of increase $\Delta$ of the accelerator opening amount is greater than or equal to the threshold value.

Figure 6:
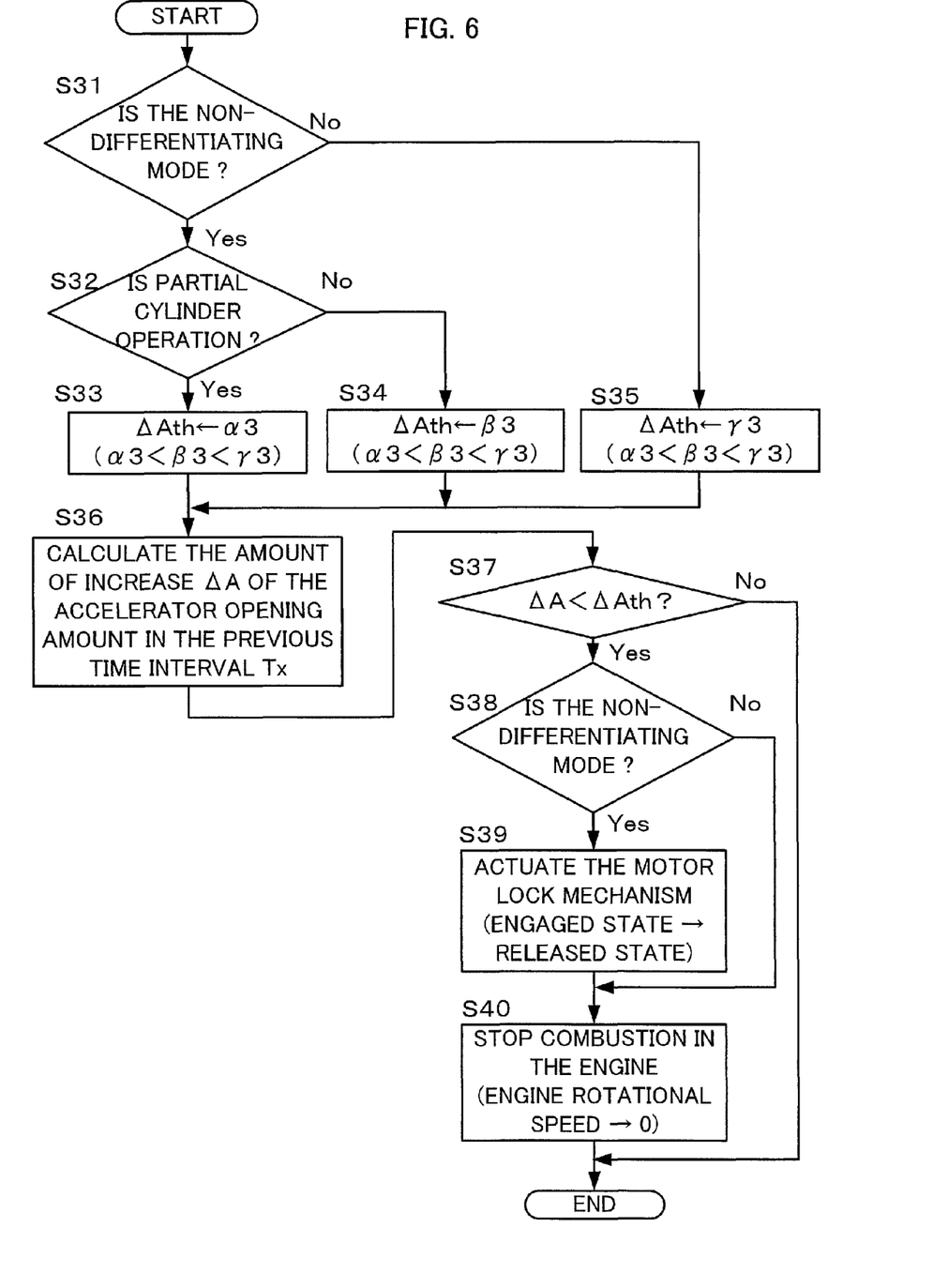
FIG. 6 is a flow chart showing an example of a control routine relating to a third embodiment.

The program for the control routine of FIG. 6 is stored in the ECU 30, and is readout at an appropriate time and executed at predetermined intervals. In the step S31, the ECU 30 makes a decision as to whether or not the current traveling mode is the non-differentiating mode. In the case of the non-differentiating mode the flow of control proceeds to the step S32. But if it is not the non-differentiating mode, in other words in the case of the differentiating mode, the flow of control is transferred to the step S35. In the step S32, the ECU 30 makes a decision as to whether or not the engine 3 is operating according to partial cylinder operation, in other words as to whether or not this is the partial cylinder non-differentiating mode. If this is the partial cylinder non-differentiating mode, then the flow of control proceeds to the step S33. But if it is not the partial cylinder non-differentiating mode, in other words if it is the all-cylinder non-differentiating mode, then the flow of control is transferred to the step S34.

In the step S33, the ECU 30 sets the value of a threshold value $\Delta Ath$ for the amount of increase $\Delta A$ of the accelerator opening amount during the predetermined time period $\Delta T$ to $\alpha 3$. And in the step S34 the ECU 30 sets the value of the threshold value $\Delta Ath$ to $\beta 3$. Moreover, in the step S35, the ECU 30 sets the value of the threshold value $\Delta Ath$ to $\gamma 3$. The relationship $\alpha 3 < \beta 3 < \gamma 3$ between $\alpha 3$, $\beta 3$, and $\gamma 3$ holds. In other words, the value of the threshold value $\Delta Ath$ during the differentiating mode is set to be greater than in the case of the non-differentiating mode. Moreover, in the case of the non-differentiating mode, the values of the threshold value $\Delta Ath$ are set to be different for the partial cylinder non-differentiating mode and for the all-cylinder non-differentiating mode. The value of the threshold value $\Delta Ath$ that is employed during implementation of the partial cylinder non-differentiating mode is smaller than the value that is employed during implementation of the all-cylinder non-differentiating mode.

In the step S36, the ECU 30 calculates the amount of increase $\Delta A$ of the accelerator opening amount in the previous time interval Tx. This calculation is implemented by the ECU 30 sequentially storing the accelerator opening amount on the basis of the accelerator opening amount sensor 32, and obtaining the difference between the accelerator opening amount in the time period Tx+$\Delta T$ before and the accelerator opening amount in the time period Tx before, on the basis of this data that has been stored.

In the step S37, the ECU 30 makes a decision as to whether or not the amount of increase $\Delta A$ of the accelerator opening amount is less than the threshold value $\Delta Ath$. If the amount of increase ΔA is less than the threshold value ΔAth, then the flow of control proceeds to the step S38. But if the amount of increase ΔA is greater than or equal to the threshold value ΔAth, then the subsequent processing is skipped, and this iteration of the routine terminates. Due to this, the traveling mode is kept in the differentiating mode or in the non-differentiating mode.

In the step S38, the ECU 30 makes a decision as to whether or not this is the non-differentiating mode. In the case of the non-differentiating mode the flow of control proceeds to the step S39, and the motor lock mechanism 25 is actuated from the engaged state to the released state, so that the system changes over from the non-differentiating mode to the differentiating mode. On the other hand, in the case of the differentiating mode, the step S39 is skipped since it is not necessary to actuate the motor lock mechanism 25, and the flow of control is transferred to the step S40.

In the step S40, the ECU 30 outputs an engine rotation stop command, so that combustion in the engine 3 is stopped. Due to this, the traveling mode is changed over to the EV mode, and, along with the engine rotational speed dropping towards zero, also the first motor generator 4 runs idle.

According to the control routine of FIG. 6, in the case of the non-differentiating mode, the value of the threshold value ΔAth is set to be larger as compared with the case of the differentiating mode. The chance for the amount of increase ΔA of the accelerator opening amount to be less than α3 or β3 is lower than the chance for it to be less than γ3. Accordingly, the condition for changing over to the EV mode during implementation of the non-differentiating mode is set to be more severe, as compared with the case during implementation of the differentiating mode. Due to this, in this third embodiment, in a similar manner to the case with the first embodiment, it is possible to suppress decrease of the durability of the motor lock mechanism 25, and thus enhancement of the system efficiency may be anticipated.

Figure 7:
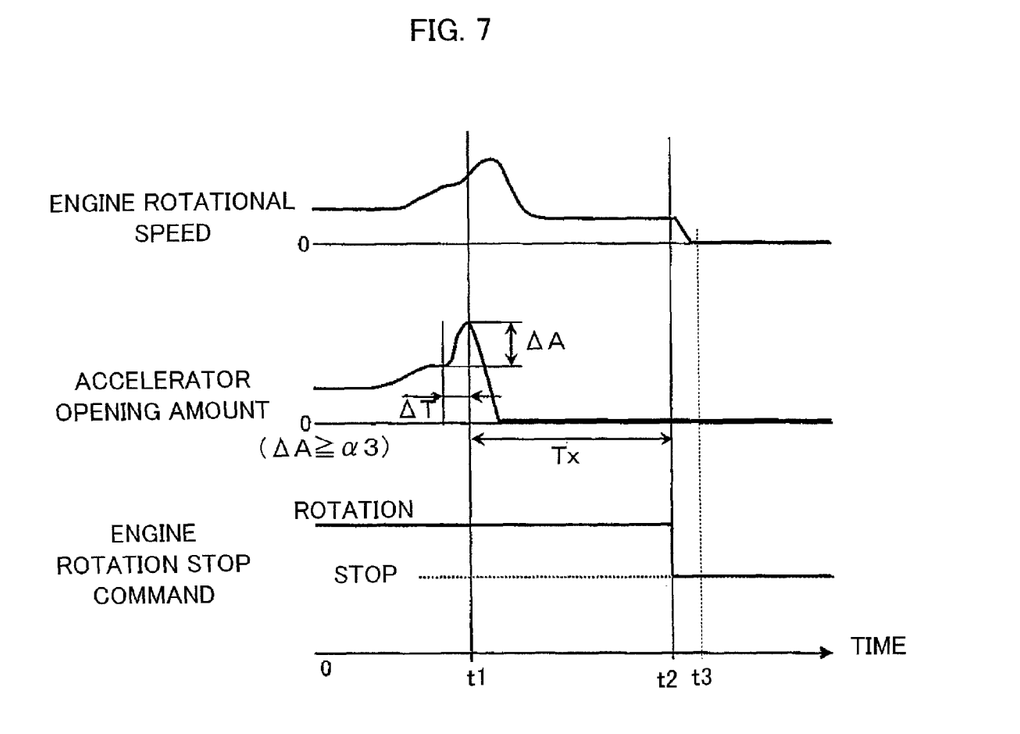
FIG. 7 is a time chart showing an example of control results for this third embodiment in the case of the partial cylinder non-differentiating mode.

In the example shown in FIG. 7, in the case of the partial cylinder non-differentiating mode, since the amount of increase ΔA in the predetermined time period ΔT before the time point t1 is greater than or equal to α3, accordingly, during the decision interval Tx from the time point t1 to the time point t2, the partial cylinder non-differentiating mode is maintained without any transition to the EV mode. And, at the time point t2, since the amount of increase ΔA during the time period Tx before the time point t2 exceeds α3, accordingly, along with the motor lock mechanism 25 being actuated from the engaged state to the released state, also an engine rotation stop command is outputted. Thereafter, the engine rotational speed drops towards zero. And at the time point t3 the engine rotational speed becomes zero.

According to this third embodiment, in a similar manner to the case with the second embodiment, the frequency of actuation of the motor lock mechanism 25 during implementation of the partial cylinder non-differentiating mode is reduced below the frequency during implementation of the all-cylinder non-differentiating mode, and accordingly it is possible further to suppress decrease of the durability of the motor lock mechanism 25. On the other hand, it becomes easier to change over to the EV mode during implementation of the all-cylinder non-differentiating mode than during implementation of the partial cylinder non-differentiating mode, and accordingly the system efficiency is enhanced.

Embodiment #4

Next, a fourth embodiment of the present invention will be explained with reference to FIGS. 8 and 9. The control in this fourth embodiment is the same as that in the second or the third embodiment, with the exception of the parameter that is set as the condition for changing over to the EV mode. In this embodiment, the absolute value grad of the downward gradient of the road surface over which the vehicle 1 is traveling is set as the condition for changing over to the EV mode. To put it in another way, in this embodiment, the differentiating mode or the non-differentiating mode is maintained if the absolute value grad of the downward gradient is greater than or equal to a threshold value.

Figure 8:
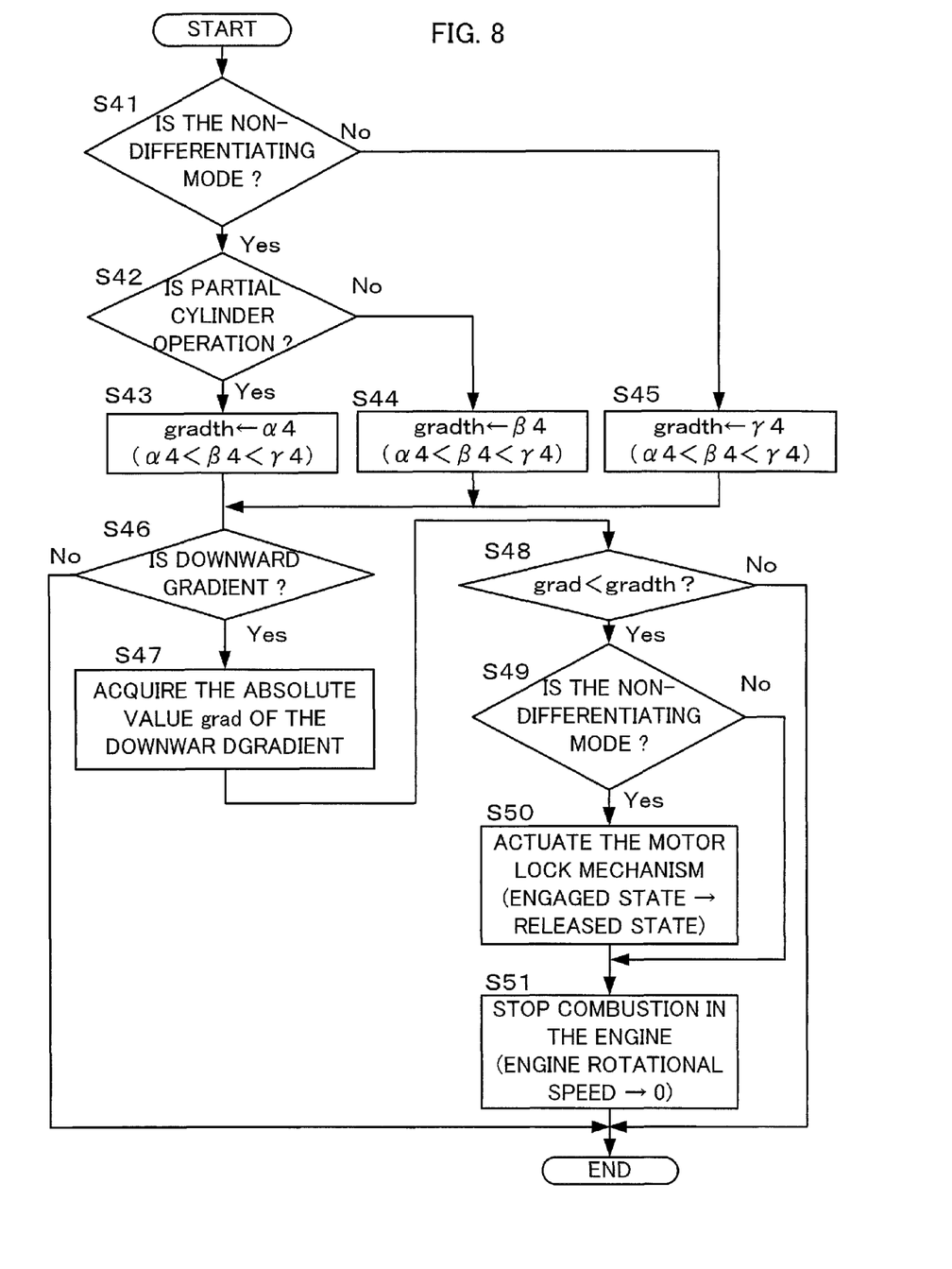
FIG. 8 is a flow chart showing an example of a control routine relating to a fourth embodiment.

The program for the control routine of FIG. 8 is stored in the ECU 30, and is readout at an appropriate time and executed at predetermined intervals. In the step S41, the ECU 30 makes a decision as to whether or not the current traveling mode is the non-differentiating mode. In the case of the non-differentiating mode the flow of control proceeds to the step S42. But if it is not the non-differentiating mode, in other words in the case of the differentiating mode, the flow of control is transferred to the step S45. In the step S42, the ECU 30 makes a decision as to whether or not the engine 3 is operating in partial cylinder operation, in other words as to whether or not this is the partial cylinder non-differentiating mode. If this is the partial cylinder non-differentiating mode, then the flow of control proceeds to the step S43. But if it is not the partial cylinder non-differentiating mode, in other words if it is the all-cylinder non-differentiating mode, then the flow of control is transferred to the step S44.

In the step S43, the ECU 30 sets the value of a threshold value gradth for the absolute value grad of the downward gradient to α4. And in the step S44 the ECU 30 sets the value of the threshold value gradth to β4. Moreover, in the step S45, the ECU 30 sets the value of the threshold value gradth to γ4. The relationship α4<β4<γ4 between α4, β4, and γ4 holds. In other words, the value of the threshold value gradth during the differentiating mode is set to be greater than in the case of the non-differentiating mode. Moreover, in the case of the non-differentiating mode, the values of the threshold value gradth are set to be different for the partial cylinder non-differentiating mode and for the all-cylinder non-differentiating mode. The value of the threshold value gradth that is employed during implementation of the partial cylinder non-differentiating mode is smaller than the value that is employed during implementation of the all-cylinder non-differentiating mode.

In the step S46, the ECU 30 makes a decision as to whether or not the road surface upon which the vehicle 1 is traveling has a downward gradient. The gradient of the road surface is acquired by the ECU 30 on the basis of the signal from a gradient sensor not shown in the figures. Then in the step S47 the ECU 30 acquires the absolute value grad of the downward gradient on the basis of the signal from the gradient sensor. And then in the step S48 the ECU 30 makes a decision as to whether or not the absolute value grad of the downward gradient is less than the threshold value gradth. If the absolute value grad of the downward gradient is less than the threshold value gradth, then the flow of control proceeds to the step S49. But if the absolute value grad of the downward gradient is greater than or equal to the threshold value gradth, then the subsequent processing is skipped and this iteration of the routine terminates. Due to this, the traveling mode is kept in the differentiating mode or in the non-differentiating mode.

In the step S49, the ECU 30 makes a decision as to whether or not this is the non-differentiating mode. In the case of the non-differentiating mode the flow of control proceeds to the step S50, and the motor lock mechanism 25 is actuated from the engaged state to the released state, so that the system changes over from the non-differentiating mode to the differentiating mode. On the other hand, in the case of the differentiating mode, the step S50 is skipped since it is not necessary to actuate the motor lock mechanism 25, and the flow of control is transferred to the step S51.

In the step S51, the ECU 30 outputs an engine rotation stop command, so that combustion in the engine 3 is stopped. Due to this, the traveling mode is changed over to the EV mode, and, along with the engine rotational speed dropping towards zero, also the first motor generator 4 runs idle.

According to the control routine of FIG. 8, in the case of the non-differentiating mode, the value of the threshold value gradth is set to be larger as compared with the case of the differentiating mode. The chance for the absolute value grad of the downward gradient to be less than $\alpha 4$ or $\beta 4$ is lower than the chance for it to be less than $\gamma 4$. Accordingly, the condition for changing over to the EV mode during implementation of the non-differentiating mode is set to be more severe, as compared with the case during implementation of the differentiating mode. Due to this, in this fourth embodiment, in a similar manner to the case with the first embodiment, it is possible to suppress decrease of the durability of the motor lock mechanism 25, and thus enhancement of the system efficiency may be anticipated.

Figure 9:
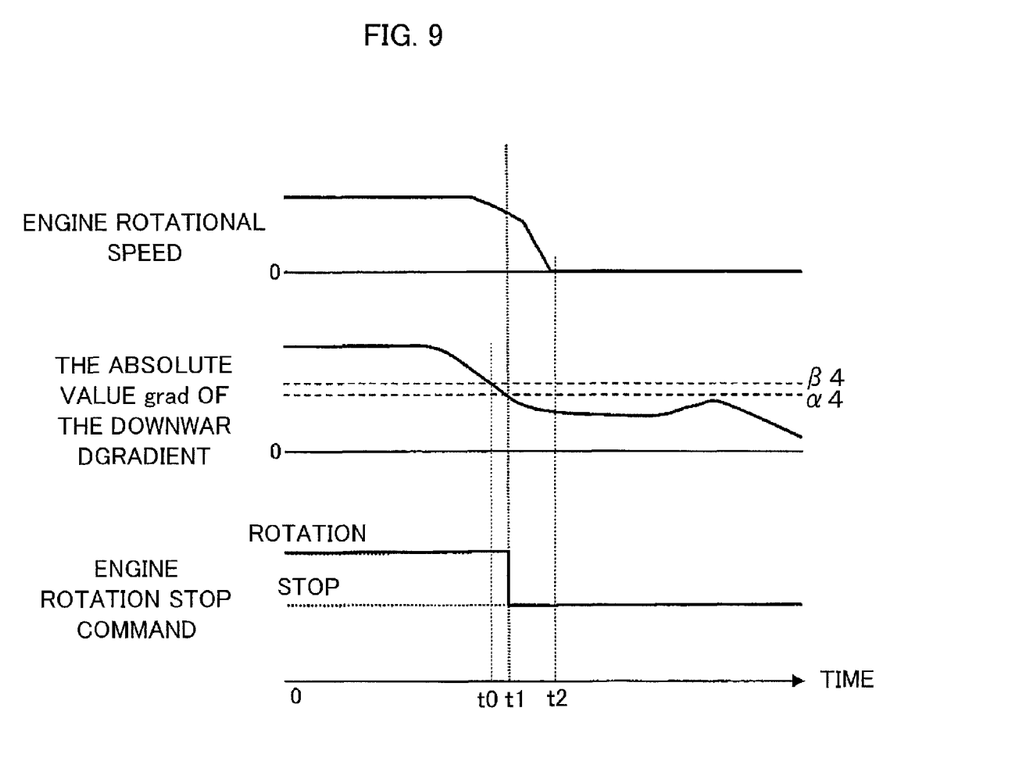
FIG. 9 is a time chart showing an example of control results for this fourth embodiment in the case of the partial cylinder non-differentiating mode.

In the example shown in FIG. 9, in the case of the partial cylinder non-differentiating mode, at the time point t0 at which the absolute value grad of the downward gradient becomes less than $\beta 4$, no engine stop command is outputted, and the partial cylinder non-differentiating mode is maintained. And, at the time point t1 at which the absolute value grad of the downward gradient becomes less than $\alpha 4$ which is less than $\beta 4$, along with the motor lock mechanism 25 being actuated from the engaged state to the released state, also an engine rotation stop command is outputted. Thereafter, the engine rotational speed drops towards zero. And at the time point t2 the engine rotational speed becomes zero.

According to this fourth embodiment, in a similar manner to the case with the second and third embodiments, the frequency of actuation of the motor lock mechanism 25 during implementation of the partial cylinder non-differentiating mode is reduced below its frequency during implementation of the all-cylinder non-differentiating mode, and accordingly it is possible further to suppress decrease of the durability of the motor lock mechanism 25. On the other hand, it becomes easier to change over to the EV mode during implementation of the all-cylinder non-differentiating mode than during implementation of the partial cylinder non-differentiating mode, and accordingly the system efficiency is enhanced.

The present invention is not limited to the various embodiments described above; it can be implemented in various different ways, provided that the scope of its essential gist is not departed from. While, in the embodiments described above, the present invention was applied to a hybrid vehicle of a type in which two motor-generators were provided, and one of these motor-generators was linked to the engine with a differential mechanism, the present invention could also be applied to a hybrid vehicle in which one motor-generator is linked to the engine with a differential mechanism. Moreover, the engine is not limited to being one in which some of the cylinders can be deactivated. Accordingly, it is also possible to apply the present invention to a hybrid engine that includes a normal type of engine in which all of the cylinders operate.

The lock mechanism that changes over the differential mechanism from the differentiating state to the non-differentiating state is not limited to being one of the type in which the rotation of the motor-generator itself is prohibited. For example, it would also be possible to implement a differential mechanism of a type in which, along with the power transmission path from the differential mechanism to the motor-generator being disconnected with a clutch, also some component in the differential mechanism is fixed, and in this case the differential mechanism would be changed over from the differentiating state to the non-differentiating state with this lock mechanism.

In the various embodiments described above, by introducing a difference in the value of the threshold value for one parameter between the differentiating mode and the non-differentiating mode, the condition for changing over to the EV mode during implementation of the non-differentiating mode is set to be more severe, as compared with the same condition implemented during the differentiating mode. However, introducing a difference in the value of the threshold value is only one example. For example, it would also be possible to set a condition for changing over to the EV mode during implementation of the non-differentiating mode to be more severe as compared with that condition during implementation of the differentiating mode, by having the value of the threshold value of one parameter be the same in the differentiating mode and in the non-differentiating mode, and by also adding another condition related to another parameter during the non-differentiating mode. In conclusion, it will be sufficient if the condition for transiting to the EV mode is made to be more difficult during implementation of the non-differentiating mode, as compared with the case during implementation of the differentiating mode. It should be understood that it would also be possible to implement the present invention by a combination of at least two of the first through the fourth embodiments described above.

While it was arranged for the second through the fourth embodiments to be implemented during inertial traveling in which the accelerator pedal is released, and/or during deceleration when the stepping on amount of the accelerator pedal is less than or equal to the predetermined value, it is not a necessary premise for these embodiments that the vehicle should be executing inertial travel or deceleration. Accordingly, it would also be possible to implement these embodiments during steady traveling or during acceleration when the engine or the second motor-generator is outputting torque.

The invention claimed is:
1. A control device for a hybrid vehicle, comprising:
an engine;
a motor-generator;
an output unit for transmitting torque to drive wheels;
a differential mechanism that links together the engine and the motor-generator; and
a lock mechanism that is capable of changing over the state of the differential mechanism between a differentiating state in which a torque of the engine is split and distributed between the first motor-generator and the output unit, and a non-differentiating state in which the splitting of the torque of the engine between the motor-generator and the output unit is stopped;
that is applied to a hybrid vehicle which is capable of implementing:
an EV mode in which, with the state of the differential mechanism being the differentiating state, combustion by the engine is stopped;
a differentiating mode in which, with the state of the differential mechanism being the differentiating state, rotation of the engine is continued;
and a non-differentiating mode in which, with the state of the differential mechanism being the non-differentiating state, rotation of the engine is continued;
and that stops combustion by the engine and changes over to the EV mode, when a predetermined condition becomes valid during implementation of the differentiating mode or of the non-differentiating mode;

and wherein the predetermined condition for transiting to the EV mode is set to be more severe during implementation of the non-differentiating mode, as compared with the case during implementation of the differentiating mode.

2. A control device according to claim 1, wherein:

the engine has a plurality of cylinders, and is capable of executing partial cylinder operation in which some of the plurality of cylinders are inactivated while the remainder of the plurality of cylinders operate, and all-cylinder operation in which all of the plurality of cylinders operate;

the non-differentiating mode includes an all-cylinder non-differentiating mode in which the engine executes the all-cylinder operation and a partial cylinder non-differentiating mode in which the engine executes the partial cylinder operation; and during implementation of the partial cylinder non-differentiating mode, the predetermined condition for transiting to the EV mode is set to be more severe, as compared with the case during implementation of the all-cylinder non-differentiating mode.

3. A control device according to claim 1, wherein, when the predetermined condition becomes valid during implementation of the differentiating mode or of the non-differentiating mode, and moreover the vehicle is performing inertial traveling, the combustion in the engine is stopped and changeover to the EV mode is performed.

4. A control device according to claim 2, wherein, when the predetermined condition becomes valid during implementation of the differentiating mode or of the non-differentiating mode, and moreover the vehicle is performing inertial traveling, the combustion in the engine is stopped and changeover to the EV mode is performed.

* * * * *